Patented June 13, 1944

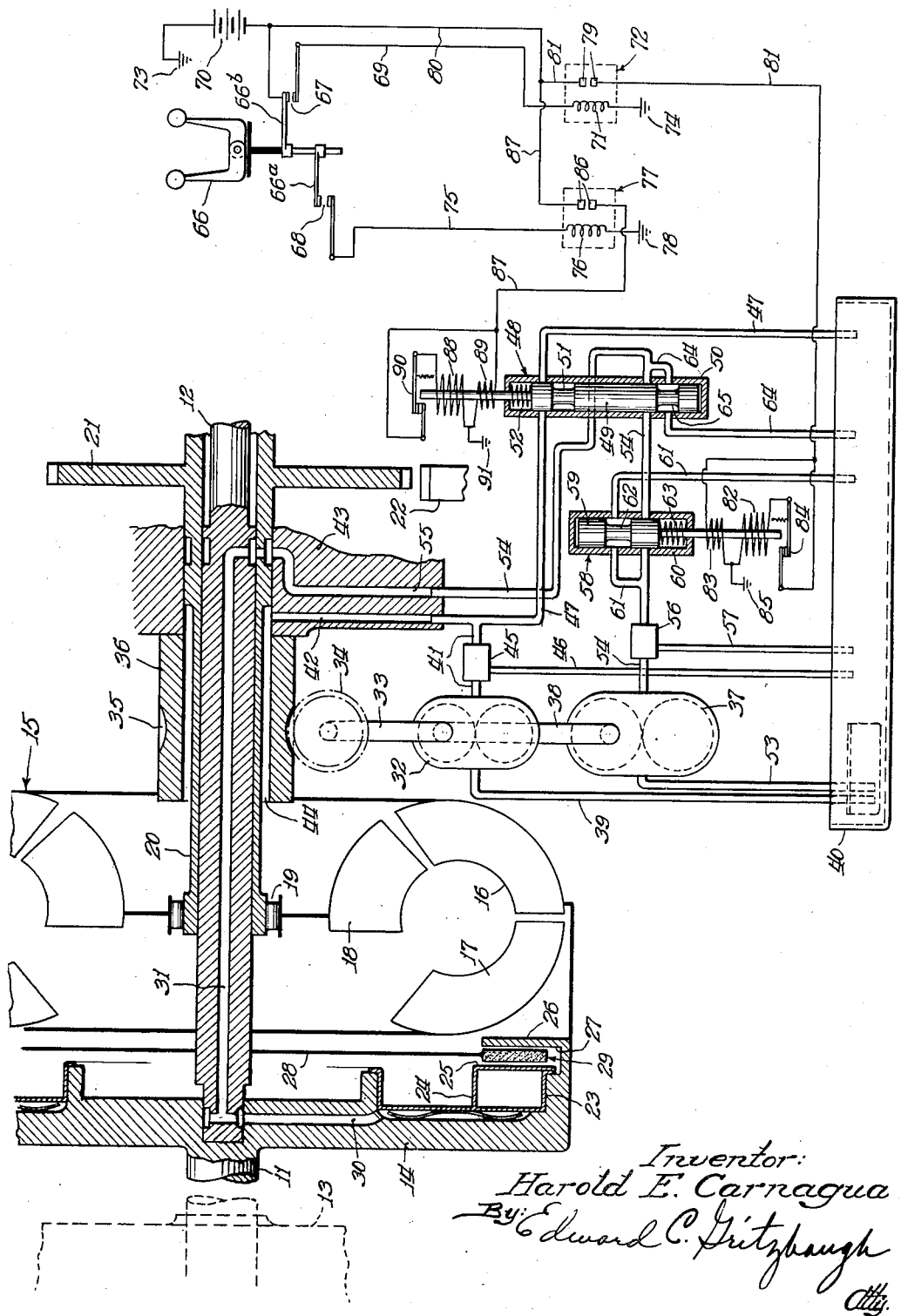

2,351,483

UNITED STATES PATENT OFFICE 2,351,483

TRANSMISSION CONTROL

Harold E. Carnagua, Muncie, Ind., assignor to Borg-Warner Corporation, Chicago, Ill., a corporation of Illinois Application August 15, 1942, Serial No. 454,972

11 Claims. (Cl. 192—3.2)

My invention relates to automatic transmissions useful in automotive vehicles, and particularly to a control mechanism therefor.

Transmissions have commonly been constructed with a hydrodynamic coupling device, which may be either a fluid coupling or a torque converter, in a power train between a source of power and a load. A hydrodynamic coupling device in a power train of a transmission enables the automotive vehicle in which the transmission is installed to be started gradually from rest and without jerking. It is common in such a transmission to provide a clutch for directly connecting the driving and driven elements of the hydrodynamic coupling device whereby, when the clutch is engaged, the output shaft of the transmission and the automotive vehicle are driven through the clutch instead of the hydrodynamic coupling device. Such a clutch is provided to increase the efficiency of the transmission at ordinary driving speeds, the clutch being more efficient than a hydrodynamic coupling device, and the smooth starting characteristics of the latter device can be dispensed with once the vehicle is in motion.

It is an object of my invention to provide for a transmission of this type improved control mechanism for bringing the clutch into engagement when the vehicle has reached ordinary operating speeds. More particularly it is an object of my invention to provide such an improved control mechanism utilizing fluid put under pressure by a pump for bringing the clutch into engagement.

Still more particularly it is an object of my invention to provide such an improved mechanism constructed so that the pump for controlling the clutch is operated against a fluid pressure substantially less than the pressure necessary for engaging the clutch when the clutch is disengaged, whereby substantially less power is required to operate the pump.

It is another object of my invention to provide, in a transmission of this type, a pump for maintaining the fluid in the hydrodynamic coupling device under pressure and to so construct the control mechanism that the pump operates against a pressure substantially less than that necessary for maintaining the hydrodynamic device in operating condition when the drive through the transmission is by means of the clutch, whereby substantially less power is required for driving the pump.

It is another object of my invention to provide such control mechanism so constructed that the pressure of fluid discharged by the pump for the clutch is raised to a value sufficient for operating the clutch at some time prior to that at which the pump is hydraulically connected with the clutch to engage it.

It is also an object of my invention to provide such control mechanism which includes a governor so connected that, at a certain speed of the vehicle and while the vehicle is being driven through the hydrodynamic device, the pump for the clutch is caused to increase the pressure of fluid against which it operates to a value sufficient for engaging the clutch, and with the governor functioning at some higher speed of the vehicle to cause the clutch and its respective pump to be hydraulically connected for engaging the clutch.

In its preferred form my invention comprises a hydrodynamic coupling device connected between input and output shafts, a friction clutch also for connecting the shafts, a pair of pumps driven by the input shaft, a conduit for connecting one of the pumps with the hydrodynamic device, a conduit for connecting the other of the pumps with the friction clutch for engaging the clutch, a valve for providing an opening through which fluid from the pump for the hydrodynamic device may freely discharge and for blocking the conduit between the other pump and the clutch, with the valve in one position closing said opening and blocking the conduit between the clutch and its respective pump and in a second position providing said opening and opening the conduit between the clutch and its respective pump, a valve for providing an opening through which fluid from the pump for the clutch may freely discharge, and a governor for moving the second valve to its closed position at a certain speed of the automotive vehicle and for moving the first named valve to its position opening the conduit between the clutch and its respective pump at some higher speed of the vehicle.

The invention consists of the novel constructions, arrangements, and devices to be hereinafter described and claimed for carrying out the above stated objects and such other objects as will appear from the following description of a certain preferred embodiment of a transmission and control mechanism therefor embodying the principles of the invention illustrated diagrammatically in the accompanying drawing, with certain of the parts of the transmission being broken away for convenience of illustration.

Referring now to the drawing, the illustrated embodiment of the invention comprises a transmission having a driving shaft 11 and a driven shaft 12. It is contemplated that the transmission may be installed in an automotive vehicle with the driving shaft 11 connected with the engine 13 of the vehicle and with driven shaft 12 connected by any suitable means with the driving wheels of the vehicle. It is contemplated that such means for connecting the shaft 12 and the vehicle driving wheels may include change speed gearing (not shown) by means of which the driving wheels of the vehicle may be rotated at different speed ratios with respect to the shaft 12.

The shaft 11 is connected in driving relation with a flywheel 14 which in turn is connected with a hydrodynamic coupling device 15. The hydrodynamic device illustrated is of the torque converter type and comprises an impeller 16, a turbine 17 and a stator 18. The impeller 16 is connected to be driven by the flywheel 14; the turbine 17 is connected in driving relation with the output shaft 12 of the transmission; and the stator 18 is connected by means of a roller clutch 19 with a sleeve-like shaft 20. The shaft 12 is piloted in the flywheel 14, and the shaft 20 is disposed concentrically on and rotatably with respect to the shaft 12. The roller clutch 19 is so constructed that it serves to prevent backward rotation of the stator 18 with respect to the shaft 20 but allows forward rotation on the stator with respect to the shaft. The shaft 20 is provided on its rear end with a disc portion 21 slotted on its periphery. A brake element 22 supported by any suitable means (not shown) is provided for engaging with teeth of the portion 21 and thereby preventing rotation of the portion 21 and shaft 20. The brake element 22 is always engaged when the hydrodynamic device 15 is used as a torque converter.

Suitable housing means, shown diagrammatically in the drawing, are provided for forming a fluid-tight container for the elements 16, 17 and 18 of the torque converter 15. With fluid in the container and with the impeller 16 being rotated, the torque converter operates, as is well known to those skilled in the art, to rotate the turbine 17 at a speed which is dependent on the speed of the impeller 16 and the load on the turbine. When the load on the turbine 17 is great, as when an automotive vehicle in which the torque converter is installed is being started from rest, the turbine 17 is rotated at a torque greater than that impressed on the impeller 16 but at a speed considerably less than that of the impeller, and the stator is held stationary by the clutch 19, and when the speed of the turbine 17 increases, the stator rotates and the torque converter operates as a simple fluid coupling.

The flywheel 14 is provided with an annular cavity 23, and a piston 24 having a bearing surface 25 is slidably disposed in the cavity. An annular portion 26 having a bearing face 27 is carried by the flywheel 14, and a clutch disc 28 of any suitable construction and non-rotatably connected with the shaft 12 is disposed with its periphery between the bearing faces 25 and 27. The bearing faces 25 and 27 and clutch disc 28 together form a friction clutch which may be designated as 29. The cavity 23 in the flywheel 14 is connected by means of a plurality of passages 30 (one being shown in the drawing) with a passage 31 in the shaft 12. The construction is such that when fluid under pressure is forced through the passages 31 and 30 to the cavity 23, the piston 24 is moved rearwardly and the bearing faces 25 and 27 and clutch disc 28 are brought into engagement, whereby the clutch 29 is engaged to drivingly connect the flywheel 14 and the driven shaft 12.

A pump 32 is provided which is driven through a suitable coupling 33 by a gear 34. The gear 34 is in mesh with and is driven by a gear 35 formed on a shaft portion 36 which is connected with and rotates with the impeller 16 and flywheel 14. A second pump 37 which is larger than the pump 32 is connected by a suitable coupling 38 with the pump 32 and coupling 33 so as also to be driven by the gear 34.

The pump 32 at its inlet end is connected by a conduit 39 with a fluid sump 40. The pump 32 at its discharge end is connected by means of a conduit 41 with a passage 42 provided in a stationary portion 43 of the transmission. The passage 42 connects with passages 44 provided in the periphery of the tubular shaft 20, and the passage 42 is thereby in communication with the interior of the fluid housing for the torque converter 15. A pressure relief valve 45 is provided in the conduit 41 and is connected by means of a conduit 46 with the sump 40. The valve 45 is of any suitable construction; and it functions to limit fluid pressure in the conduit 41 between the valve and passage 42 and also in the last named passage, the passages 44 and the fluid container for the torque converter 15 to a certain maximum value, this pressure value being sufficient whereby the shaft 12 may be driven through the torque converter 15. When the pressure of the fluid discharged by the pump 32 is greater than this value, a portion of the fluid discharged by the pump flows through the conduit 46 to the sump 40 due to action of the valve 45.

A conduit 47 is provided for connecting the conduit 41 with the sump 40. A valve 48 comprising a plunger 49 and a plunger casing 50 is provided in the conduit 47. The plunger 49 is formed with a constricted portion 51 which serves to open the passage 47 when the plunger is moved upwardly against the action of a spring 52 by means hereinafter to be described. As is apparent, the plunger 49 in its position as shown in the drawing serves to block or close the passage 47.

The pump 37 is connected at its inlet end with the sump 40 by a conduit 53 and at its discharge end is connected by a conduit 54 with a passage 55 provided in the stationary portion 43 of the transmission. The passage 55 is in communication with the passage 31 in the shaft 12 as may be seen in the drawing. A pressure relief valve 56 is provided in the conduit 54. This valve functions to limit the fluid pressure in the conduit 54 beyond the valve 56 to a predetermined value which is sufficient for engaging the clutch 29, and the valve discharges fluid through the conduit 57 to the sump 40 when the pump 37 discharges fluid at a pressure greater than this pressure value.

A valve 58 comprising a plunger 59 and a casing 60 therefor is provided in the conduit 54. A conduit 61 is provided for connecting the conduit 54 with the sump 40, and the valve 58 is disposed also in the conduit 61 as shown. The valve plunger 59 is provided with a constricted portion 62 which serves to open the conduit 61 when the plunger is in its upper position as shown in the drawing and which serves to open the conduit 54 when the plunger is moved downwardly against the action of a spring 63 by means hereinafter to be described. In the lower position of the plunger with the constricted portion 62 opening the conduit 54, the plunger 59 serves to block the conduit 61.

The valve 48 is disposed in the conduit 54 as shown in the drawing. A conduit 64 is provided for connecting the conduit 54 between the valve 48 and passage 55 with the sump 40, and the valve 48 is also disposed in this conduit. The valve plunger 49 is provided with a constricted portion 65 which serves, when the plunger is in its lower position as seen in the drawing, to open the passage 64 and which serves, when the valve is in its upper position with the constricted portion 51 opening the conduit 47, to open the conduit 54. In the lower position of the plunger 49, the plunger blocks the conduit 54, and in its upper position, the plunger blocks the conduit 64.

The valves 48 and 58 are controlled electrically and in accordance with the speed of the automotive vehicle on which the transmission is installed. A governor 66 is provided which is driven with the propeller shaft of the vehicle and thereby also with the output shaft of the transmission, and the governor is therefore responsive to the speed of the vehicle. The governor is arranged to make and break contacts 67 and 68, the contacts 67 being closed at a certain speed of the vehicle, for example 10 miles per hour, and the contacts 68 being closed at some higher speed of the vehicle, for example 12 miles per hour. The contacts 67 when made complete a circuit by means of a lead 69 including the battery 70 of the vehicle and the energizing winding 71 of a relay 72. The battery 70 is grounded at 73, and the winding 71 is grounded at 74, and this circuit completed by the contacts 67 includes the chassis of the vehicle. The contacts 68 when made complete a circuit by means of a lead 75 and the movable contact arms 66a and 66b of the governor including the vehicle battery 70 and the energizing winding 76 of a relay 77. The winding 76 is grounded at 78, and this circuit also includes the chassis of the vehicle.

The contacts 79 of the relay 72 are closed upon energization of the relay winding 71, and these contacts serve to complete a circuit by means of leads 80 and 81 including the battery 70, an energizing coil 82, a holding coil 83, and a switch 84. As may be seen in the drawing the coils 82 and 83 are connected in parallel with both of the coils being connected to the lead 81 and being provided with a common ground 85. The coils 82 and 83 when energized act magnetically on the plunger 59 to pull the plunger against the action of the spring 63 to its lower position with the constricted portion 62 of the plunger opening the conduit 54. The switch 84 is connected in series with the coil 82 and normally completes a circuit through the coil between the lead 81 and ground 85. The switch 84 is opened by the plunger 59 on movement thereof to its lower position.

The contacts 86 of the relay 77 are made upon energization of the relay winding 76, and the contacts serve to complete a circuit by means of a lead 87 and the lead 80 including the battery 70, an energizing coil 88, a holding coil 89, and a switch 90. The coils 88 and 89 are connected in parallel, both being connected with the lead 87 and being provided with a common ground 91. The coils upon energization act magnetically upon the plunger 49 to draw the plunger upwardly against the action of the spring 52 to its upper position with the constricted portion 51 of the plunger opening the conduit 47. The switch 90 is connected in series with the coil 88 and is normally closed. The plunger 49 upon movement to its upper position operates to open the switch 90.

When the engine 13 is not in operation, the transmission and controls therefor are substantially in the positions shown in the drawing; the contacts 67 and 68 are open, the relay contacts 79 and 86 are open, the valve plunger 49 is in its lower position, the valve plunger 59 is in its upper position, the clutch 29 is disengaged, and the brake element 22 may be in its inoperative position as shown. Prior to starting the engine, the brake element 22 is moved to its operative position to brake the disc portion 21 and the shaft 20.

When the engine 13 is started, the flywheel 14, the shaft portion 36, the gears 35 and 34, and the couplings 33 and 38 rotate, and the pumps 32 and 37 are driven. The pumps 32 and 37 draw fluid from the sump 40 through the conduits 39 and 53, respectively, and discharge fluid into the conduits 41 and 54 respectively. The constricted portion 62 of the valve plunger 59 is in its upper position opening the conduit 61, and the fluid discharged by the pump 37 flows through the conduits 54 and 61 back to the sump 40. The valve plunger 49 is in its lower position blocking the conduit 47, and the pump 32 and valve 45 operate to raise the fluid pressure to and maintain it at a predetermined value in the passages 42 and 44 and thereby in the fluid housing for the torque converter 15. With fluid under pressure in the fluid housing for the torque converter, the output shaft 12 of the transmission is driven from the flywheel 14 through the impeller 16 and turbine 17, this drive, as hereinbefore explained, being at first at an increased torque due to the action of the stator 18.

When the speed of the vehicle, due to the drive through the torque converter, has increased sufficiently, the contacts 67 are closed by the governor to energize the relay winding 71 and close the contacts 79. The contacts 79 when closed complete a circuit including the battery 70 and windings 82 and 83, and the windings are energized to move the valve plunger 59 to its lower position thereby closing the conduit 61 and opening the conduit 54. The valve plunger 59 on moving to its lower position opens the switch 84, and current ceases to flow through the coil 82, and the plunger is maintained in its lower position by current flowing through the holding coil 83. With the plunger in its lower position, the pressure of fluid in the conduit 54 between the valves 56 and 48 increases to its predetermined maximum value as determined by the valve 56 which pressure is sufficient for bringing the clutch 29 into engagement.

When the speed of the vehicle increases still further, the contacts 68 close to complete a circuit including the battery 70 and the winding 76 to energize the latter. The relay contacts 86 are thereby closed and complete a circuit including the battery 70 and the coils 88 and 89 to energize the latter. The coils 88 and 89 upon energization move the valve plunger 49 to its upper position to open the conduits 47 and 54 and to close the conduit 64. The plunger 49 on such movement opens the switch 90 whereby current ceases to flow through the coil 88, and the coil 89 remains energized to hold the plunger 49 in its upper position. With the plunger 49 in its upper position, and with the plunger 59 remaining in its lower position, fluid flows through the conduit 54 and passages 55, 31 and 30 to move the piston 24 rearwardly to engage the clutch 29. The output shaft 12 of the transmission is then driven from the flywheel 14 and through the clutch 29. With the plunger 49 in its upper position, fluid from the torque converter flows through the passages 44 and 42 and conduit 47 to the sump 40.

When the speed of the vehicle is decreased to open the contacts 68, the winding 76 is deenergized, the contacts 86 are open, the winding 89 is deenergized, and the valve plunger 49 is moved by the spring 52 to its lower position, as shown in the drawing. The conduit 47 is thereby blocked, and the pump 32 and valve 45 operate to increase the fluid pressure in the passages 42 and 44 and in the fluid housing of the torque converter 15 whereby the torque converter is again capable of driving the output shaft 12. With the valve plunger 49 in its lower position, the constricted portion 65 of the plunger opens the conduit 64 whereby fluid drains through the passages 30, 31 and 55 and conduits 54 and 64 to disengage the clutch 29, and the output shaft 12 is again driven through the torque converter.

When the speed of the vehicle is decreased still further to open the contacts 67, the winding 71 is deenergized, the contacts 79 are opened, the coil 83 is deenergized, and the spring 63 operates to move the valve plunger 59 to its upper position. The fluid discharged by the pump 37 may then flow freely through the conduit 61 to the sump 40.

The valves 48 and 58 advantageously operate, with the valve plungers in the positions shown in the drawing, to provide an outlet by means of the conduit 61 through which fluid from the pump 37 may freely discharge when the drive through the transmission is through the torque converter. No power is thus wasted in driving the pump 37 against a fluid pressure sufficient for engaging the clutch 29 when the clutch is disengaged. The valves 48 and 58 advantageously operate, with the valve plunger 59 being in its lower position and the valve plunger 49 in its upper position, to provide an outlet through the conduit 47 through which fluid from the pump 32 may freely discharge when the drive is through the friction clutch 29. Power is thus not unnecessarily used in driving the pump 32 against fluid pressure sufficient for a drive through the torque converter when the drive is through the friction clutch. The governor operates to move the valve plunger 59 to its lower position to block the discharge conduit 61 at a speed lower than that at which the valve plunger 49 is moved to its upper position, and the pressure of fluid in the conduit 54 between the valve 56 and valve 48 is thus increased to a value sufficient for operating the clutch 29 at a time prior to that at which the valve plunger 49 moves to open the passage 54. The clutch 29 is thus brought into engagement appreciably sooner after the movement of the valve plunger 49 to its upper position than would be the case if the pressure of fluid in no part of the conduit 54 were increased to clutch operating value by the time the valve plunger 49 is moved upwardly.

I wish it to be understood that my invention is not to be limited to the specific transmission and control mechanism therefor shown and described except so far as the claims may be so limited as it will be apparent to those skilled in the art that changes may be made without departing from the principles of my invention. In particular I wish it to be understood that, although I have shown and described a clutch 29 having a clutch engaging piston 24 operated by a fluid under a pressure greater than atmospheric pressure, it is within the scope of my invention, except so far as the claims may be so limited, to provide such a clutch having clutch engaging means operated by fluid under a pressure less than atmospheric pressure.

I claim:

1. In a transmission, the combination of an input shaft, an output shaft, means for transmitting torque from said input shaft to said output shaft and adapted to be controlled by fluid pressure, a pump connected by a passage with said torque transmitting means for supplying fluid under pressure to said means, a valve in said passage for providing an outlet through which fluid from said pump may freely discharge whereby the power required for driving said pump is substantially reduced, and a second valve for closing said passage whereby when said first valve is in its outlet closing position the pressure of fluid discharged from said pump is increased to a value sufficient for controlling said torque transmitting means.

2. In a transmission, the combination of an input shaft, an output shaft, means for transmitting torque from said input shaft to said output shaft and including a clutch, fluid pressure responsive means for bringing said clutch into engagement, a pump connected by a passage with said fluid pressure responsive means, a valve in said passage for providing an outlet through which fluid from said pump may freely discharge whereby the power required for driving said pump is substantially reduced, and a second valve for closing said passage whereby when said first valve is in its outlet closing position the pressure of fluid discharged from said pump is increased to a value sufficient for bringing said clutch into engagement.

3. In a transmission for an automotive vehicle, the combination of an input shaft, an output shaft, a governor driven with one of said shafts, means for transmitting torque from said input shaft to said output shaft and including a clutch, fluid pressure responsive means for bringing said clutch into engagement, a pump connected by a passage with said fluid pressure responsive means, a valve in said passage for providing an outlet through which fluid from said pump may freely discharge whereby the power for driving said pump is substantially reduced, and a valve for closing said passage whereby when said first named valve is in its outlet closing position the pressure of fluid discharged from said pump is increased to a value sufficient for bringing said clutch into engagement, said governor being adapted to control said valves to move said first named valve to its outlet closing position at a certain speed of the shaft rotating with the governor and to move said second named valve to its passage opening position at a higher speed of said shaft.

4. In a transmission, the combination of an input shaft, an output shaft, a clutch and a hydrodynamic power transmitting device each for operatively connecting said shafts, fluid pressure responsive means for bringing said clutch into engagement, a pump connected by a passage with said hydrodynamic device for supplying fluid under pressure thereto, a pump connected by a passage with said clutch engaging means for supplying fluid under pressure thereto, a valve in said last named passage for providing an outlet through which fluid from said last named pump may freely discharge, and a second valve for closing said last named passage whereby when said first named valve is in its outlet closing position the pressure of fluid discharged from said last named pump is increased to a value sufficient for bringing said clutch into engagement.

5. In a transmission for an automotive vehicle, the combination of an input shaft, an output shaft, a governor driven with one of said shafts, a clutch and a hydrodynamic power transmitting device each for operatively connecting said shafts, fluid pressure responsive means for bringing said clutch into engagement, a pump connected by a passage with said hydrodynamic device for supplying fluid under pressure thereto, a pump connected by a passage with said clutch engaging means for supplying fluid under pressure thereto, a valve in said last named passage for providing an outlet through which fluid from said pump may freely discharge, and a valve for closing said last named passage whereby when said first named valve is in its outlet closing position the pressure of fluid discharged from said pump is increased to a value sufficient for bringing said clutch into engagement, said governor being adapted to control said valves to move said first named valve to its outlet closing position at a certain speed of the shaft rotating with the governor and to move said second named valve to its passage opening position at a higher speed of said shaft.

6. In a transmission, the combination of an input shaft, an output shaft, a clutch and a hydrodynamic power transmitting device each for operatively connecting said shafts, means dependent for its operation upon fluid under a pressure other than atmospheric for bringing said clutch into engagement, a pump connected by a first passage with said hydrodynamic device for supplying fluid under pressure thereto, a pump connected by a second passage with said clutch engaging means for producing the operating pressure for the engaging means, and valve means in one condition completing said first passage and providing a relief opening for said second passage to restore the pressure produced by said second named pump to atmospheric pressure, said valve means in another condition thereof providing a relief opening for said first passage through which fluid may freely discharge and completing said second passage for engaging said clutch.

7. In a transmission, the combination of an input shaft, an output shaft, a clutch and a hydrodynamic power transmitting device each for operatively connecting said shafts, fluid pressure responsive means for bringing said clutch into engagement, a pump connected by a first passage with said hydrodynamic device for supplying fluid under pressure thereto, a pump connected by a second passage with said clutch engaging means for supplying fluid under pressure thereto, and valve means in one condition thereof providing an outlet for said second passage through which fluid may freely discharge and completing said first passage, said valve means in another condition thereof providing an outlet for said first passage through which fluid may freely discharge and completing said second passage for engaging said clutch.

8. In a transmission, the combination of an input shaft, an output shaft, a clutch and a hydrodynamic power transmitting device each for operatively connecting said shafts, fluid pressure responsive means for bringing said clutch into engagement, a pump connected by a first passage with said hydrodynamic device for supplying fluid under pressure thereto, a pump connected by a second passage with said clutch engaging means for supplying fluid under pressure thereto, and valve means in one condition thereof completing said first passage to render said hydrodynamic device effective and providing an outlet for said second passage through which fluid may freely discharge for maintaining said clutch disengaged, said valve means in another condition thereof providing an outlet for said first passage through which fluid may freely discharge for rendering said hydrodynamic device ineffective and completing said second passage for engaging said clutch.

9. In a transmission, the combination of an input shaft, an output shaft, a pair of means each for transmitting torque from said input shaft to said output shaft and each adapted to be controlled by fluid pressure, a pair of pumps each connected by a passage with one of said torque transmitting means for supplying fluid under pressure to the torque transmitting means, a valve in one position thereof completing a first one of said passages and blocking the second one of said passages and in another position thereof providing an opening in said first passage through which fluid may freely discharge and completing said second passage for a flow of fluid therethrough, and a second valve providing an opening in said second passage through which fluid may freely discharge when said first named valve is in its first named position.

10. In a transmission, the combination of an input shaft, an output shaft, a clutch and a hydrodynamic power transmitting device each for operatively connecting said shafts, fluid pressure responsive means for bringing said clutch into engagement, a pump connected by a first passage with said hydrodynamic device for supplying fluid under pressure thereto, a pump connected by a second passage with said clutch engaging means for supplying fluid under pressure thereto, a valve in one position thereof completing said first passage and blocking said second passage and in another position thereof providing an outlet through which fluid from said first passage may freely discharge and completing said second passage for a flow of fluid therethrough, and a second valve in one position thereof providing an outlet through which fluid may freely discharge from said second passage and in another position thereof completing said second passage whereby when said first named valve is in its first named position the pressure of fluid discharged from said second named pump may be increased to a value sufficient for bringing said clutch into engagement.

11. In a transmission for an automotive vehicle, the combination of an input shaft, an output shaft, a governor driven with one of said shafts, a clutch and a hydrodynamic power transmitting device each for operatively connecting said shafts, fluid pressure responsive means for bringing said clutch into engagement, a pump connected by a first passage with said hydrodynamic device for supplying fluid under pressure thereto, a pump connected by a second passage with said clutch engaging means for supplying fluid under pressure thereto, a valve in one position blocking said second passage and completing said first passage to render said hydrodynamic device effective and in another position providing an outlet for said first passage through which fluid may freely discharge and completing said second passage for a flow of fluid therethrough, and a second valve in one position providing an outlet for said second passage through which fluid may freely discharge and in another position completing said second passage for a flow of fluid therethrough whereby when said first named valve is in its first named position the pressure of fluid discharged from said second named pump may be increased to a value sufficient for bringing said clutch into engagement, said governor being adapted to control said valves to move said second named valve from its first named position to its second named position at a certain speed of the shaft rotating with the governor and to move said first named valve from its first named position to its second named position at a higher speed of said shaft.

HAROLD E. CARNAGUA.